May 30, 1967   J. M. KREBS   3,321,905
DISPLAY DEVICE
Filed Oct. 1, 1965
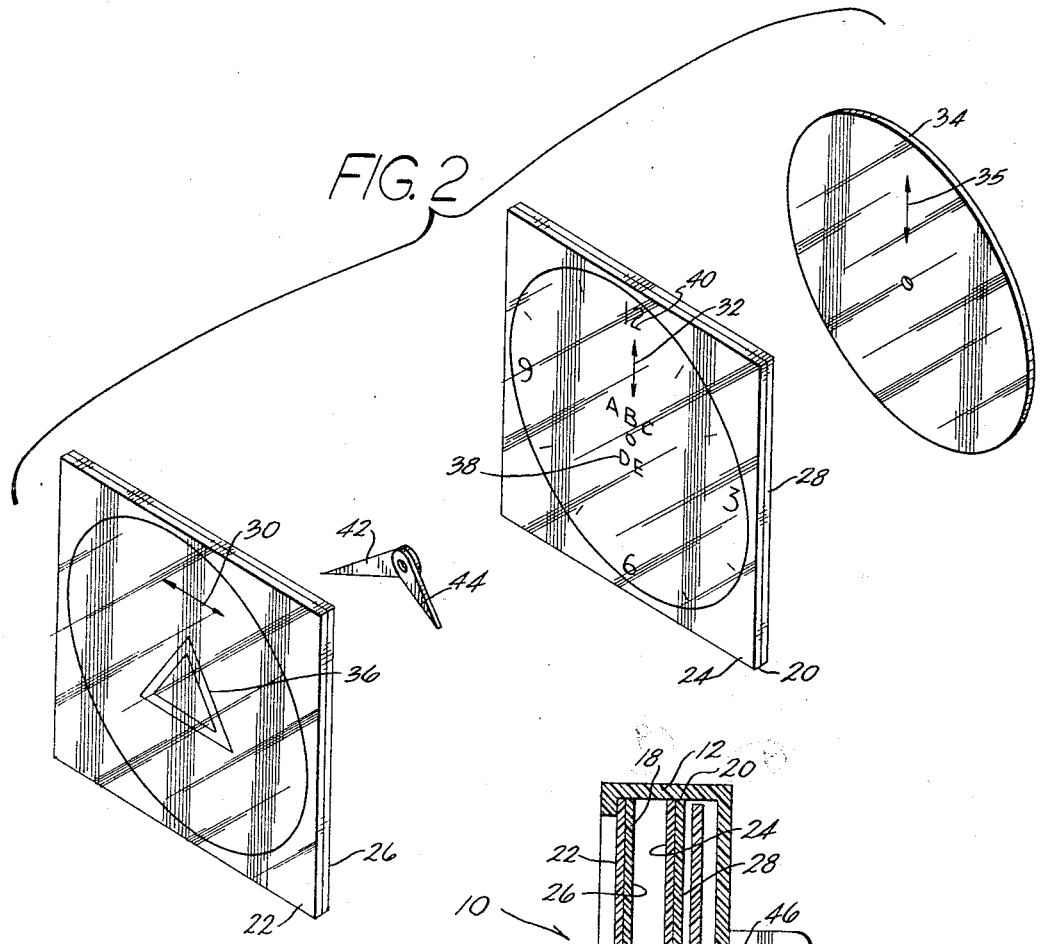
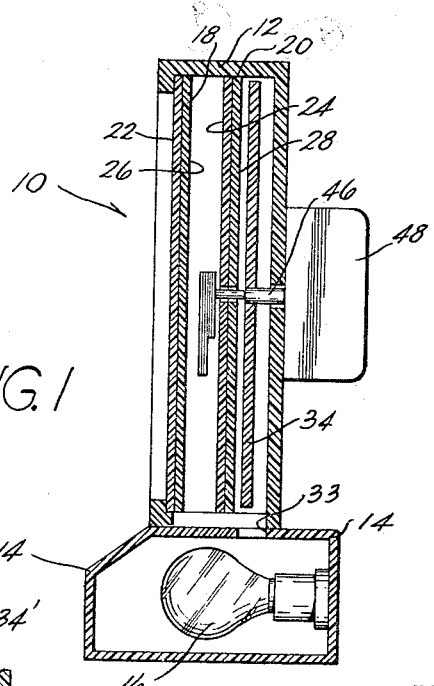
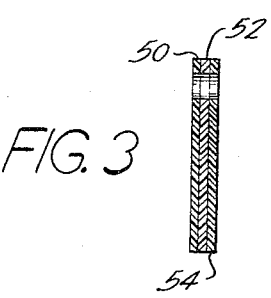
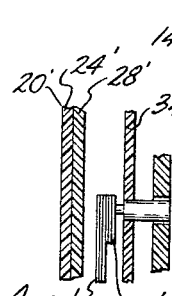
INVENTOR.
JIMMIE M. KREBS
BY
Joseph D. Smigner
ATTORNEY

United States Patent Office 3,321,905
Patented May 30, 1967

3,321,905
DISPLAY DEVICE
Jimmie M. Krebs, San Francisco, Calif., assignor to Display Corporation, Milwaukee, Wis., a corporation of Wisconsin
Filed Oct. 1, 1965, Ser. No. 492,188
18 Claims. (Cl. 58—50)

This invention relates to display devices and, more particularly, to such devices as use polarized material to achieve a visual effect.

A general object of this invention is to provide an improved display device utilizing polarized material to achieve a changing visual effect.

Another general object of this invention is to provide a clock display utilizing polarized material to achieve a visual effect with the usual clock elements or indicia; and, in addition, to combine the clock display with advertising copy both of which are made to undergo a visual change by producing relative movement between members of polarized material.

A more specific object of this invention is to provide a clock display wherein a part of the clock elements is alternately rendered visible and invisible while the remainder of the clock elements are continuously visible.

Other objects and advantages will be pointed out in, or be apparent from, the specification and claims, as will obvious modifications of the embodiments shown in the drawings, in which:

FIG. 1 is a sectional view through a display device embodying this invention;

FIG. 2 is an exploded view of the visual effect producing portion of the display device;

FIG. 3 is an enlarged sectional view of one of the clock hands; and

FIG. 4 is a partial sectional view of a modified embodiment of this invention.

With particular reference to the drawings, a visual effect producing assembly 10 is supported in a frame 12 and a light source 14 is disposed in a housing 16 which opens to the visual effect assembly through restricted opening 33 to light the visual effect assembly from the back. As is perhaps best illustrated in FIG. 2, visual effect producing assembly 10 includes members 18 and 20 supported in fixed relation in housing 12 and overlapping each other. Both members 18 and 20 are made of polarized material, for example, polarized emulsions 22 and 24 carried on suitable, transparent backing supports 26 and 28, respectively. This arrangement is commonly referred to as polarized film and the thicknesses of the polarized emulsions and the supports have been exaggerated in FIG. 1 for better illustration. Polarized emulsion 22 of member 18 has a defined, uniform light transmission axis throughout and oriented in the direction of arrow 30. Similarly, polarized emulsion 24 of member 20 has a defined, uniform light transmission axis throughout and which in turn is oriented in the direction of arrow 32. Members 18 and 20 are assembled so that the light transmission axes thereof are relatively arranged at right angles to each other. In other words, with the light transmission axes so arranged light which is blocked by member 18 will pass freely through member 32 and conversely light which is blocked by member 20 will pass freely through member 18.

Assembly 10 also includes a polarized analyzer disk 34. The analyzer disk is also polarized to exhibit a defined, uniform light transmission axis throughout as illustrated by arrow 35. The disk is supported to rotate in alignment with members 18 and 20 and when rotated the angular relationship between the transmission axis of the analyzer disk and the light transmission axes of members 18 and 20 is continuously varied. As the analyzer disk rotates its transmission axis will selectively and alternately be aligned with and disposed at right angles to the transmission axes of the polarized members 18 and 20 so that light is selectively and alternately blocked by the cooperation of the disk and members 18 and 20.

To utilize this selective blocking and produce a visual effect, the polarized emulsion portions of members 18 and 20 are each provided with restricted areas having characteristics which have been altered and vary from the characteristics of the remainder of the polarized members. For example in the restricted areas, the polarized characteristics of the polarized emulsion can be destroyed so that these areas do not exhibit the defined, uniform light transmission properties or the coloration of the emulsion can be bleached out to achieve a difference in coloration or contrast between these restricted areas and the remainder of members 18 and 20. In the illustrated embodiment, emulsion 22 of member 18 is provided with a restricted area 36 in which the polarized emulsion has been so treated. Treatment of the polarized film to produce these areas can be carried out in accordance with the method disclosed and claimed in the copending application of James M. Krebs, entitled, "Method of Processing Polarized Material," Ser. No. 491,916, filed Oct. 1, 1965, and assigned to the assignee of this application. Taking, for example, a condition wherein the polarized emulsion has been removed in area 36 by a suitable etching medium, this does not exhibit a defined, light transmission axis and will transmit light regardless of orientation with the polarized disk or the wave length of the light presented to that particular area. It will be appreciated that area 36 can take any suitable form, a triangle having been shown merely as an example. Similarly, film 24 of member 20 is provided with restricted areas 38 and 40 wherein the polarized emulsion has been removed so that they do not exhibit a defined, light transmission axis. The copy on member 20 can also take any form, for example suitable copy as illustrated by lettering 38. In the preferred embodiment at least a portion of the copy on member 20 is in the form of a clock face 40 for reasons which will be explained more completely hereinafter.

As disk 34 rotates area 36 of member 18 and areas 38 and 40 of member 20 are alternately and selectively rendered visible. More particularly, when the transmission axis of polarized disk 34 is aligned with that of the emulsion 24, member 20 passes light freely and the copy on film 24, member 20, will be invisible. However, emulsion 22 will block the light passed by emulsion 24 except in area 36 where the emulsion is removed and through which light passes freely. Thus, a contrast is created between the copy provided by area 36 and the remainder of member 18 so that the copy is clearly visible. As disk 34 continues to rotate its transmission axis will eventually be aligned with that of emulsion 22 and member 18 will freely pass light so that its copy, area 36, becomes invisible. With this orientation emulsion 24 blocks the light passed by member 18 except in the areas 38 and 40 thereby producing a contrast between these areas and the remainder of member 20 so that the lettering and clock face provided by areas 38 and 40 are visible. As the analyzer disk rotates the copy 36 and 38 and 40 alternately appear and disappear to give a striking visual effect. Light source 16 provides reflected and direct light to enhance the visual effect but other light arrangements can be used.

Having described one of the features of this invention, namely the appearance and disappearance of two separate pieces of copy, the description of the clock portion of the visual effect assembly 10 will now be completed. A pair of clock hands 42 and 44 are positioned between polarized members 18 and 20 and adjacent the clock face indicia 40 which is provided in emulsion 24 of member 20. The clock hands are mounted on shaft 46 driven by suitable clock drive 48. For an effective clock display it is desirable that clock hands 42 and 44 be constructed so as to be visible at all times. If the clock hands were made of unoriented material the hands would of course be rendered invisible whenever light were passed through one or the other of members 18 or 20. Similarly, it was discovered that merely fabricating the hands so that they would have a definite light transmission axis was not satisfactory since at various intervals the transmission axis thereof would be in alignment with the axis of the analyzer disk and one or the other of the axes of the members 18 and 20 and again be rendered invisible. This invention solves this problem by utilizing an overlay on each of the hands 44 and with each layer of the overlay having a light transmission axis. Both hands are identical and only hand 42 is illustrated in FIG. 3. The light transmission axes of layers 50 and 52 of each of the hands are supported on carrier 54 and disposed at an angle to each other so that at no time will the axes of both layers be in alignment with that of the analyzer disk and/or those of members 18 and 20 so that the hands remain visible at all time. Preferably, the layers are made of birefringent material which, in a well-known manner, exhibit definite light transmission characteristics and in a sense similar to polarized material have a defined transmission axis. More specifically, bifringent materials exhibit the characteristics of confusing polarized light, i.e. if they receive polarized light they pass it as unpolarized light. This confusion of the light occurs except in a condition where the transmission axis of the birefringent material is parallel to that of the member polarizing the light in which case the wave length of the polarized light is aligned with the transmission axis of the birefringent material and passes unaffected. Preferably, the birefringent materials of each hand are positioned with their transmission axes at an oblique angle to each other, specifically at 45°, so that at no time will the transmission axis of either layer of each clock hand be aligned with the transmission axis of either member 18 or 20 and the disk and the hands will then remain visible at all time throughout their cycle of rotation. In the preferred embodiment one of the layers of each of the hands 42 and 44 have their transmission axes disposed radially and the transmission axes of the other layer is at 45° to the radial axis. This specific arrangement is preferred for it has been observed that maximum birefringence occurs when the transmission axes of the birefringent members is at 45° to the transmission axis of the analyzer, therefore at points where the hands would otherwise disappear the birefringence, and coloration, is optimum.

With the birefringent layers so arranged the hands are constructed so that they can remain visible throughout their full cycle of rotation. However, to maintain visibility in a display device the polarization of the other elements of the display must also be considered. In the preferred embodiment of FIGS 1–3, hands 42 and 44 are positioned between the polarized members 18 and 20 where the birefringent materials of the hands can function to confuse the light passing through member 20 and prevent the light being completely blocked out by member 18. With the hands so positioned they will disappear momentarily when the transmission axes of member 20 and analyzer disk 34 are at right angles because all light is momentarily blocked, however, hands will remain visible throughout the remainder of the cycle of rotation of the analyzer disk. If positioned either in front of member 18 or behind member 20 they would always be invisible due to the transmission axes of members 18 and 20 being at right angles. It will be appreciated that the momentary disappearance of the clock hands at this point in the rotation of the analyzer disk is a result of the interaction of the disk and the polarized member but is not due to the orientation of the birefringent material on the hands.

This momentary disappearance of the clock hands only occurs in the combined advertising copy and clock display and the clock hands can be made to remain visible at all times in a display which includes only polarized member 18 or 20, i.e. only a clock display which could incidentally have other advertising copy on its face. With reference to FIG. 4, continuous visibility of the clock hands is achieved by positioning clock hands 42' and 44' between member 20' and polarized analyzer 34'. Birefringent layers are provided on the hands as described above in connection with hands 42 and 44 and member 20' includes polarized emulsion 24' on carrier 28' and treated in the manner described to provide a clock face, and copy if desired. With this arrangement the clock face will alternately appear and disappear as the transmission axis of analyzer 34' is respectively arranged at right angles to and aligned with the transmission axis of emulsion 24'. However, the hands will remain visible at all times both throughout their cycle of rotation and that of analyzer disk 34'. At the point where the transmission axes are at right angles and all light would be blocked the hands tend to confuse at least that portion of the polarized light coming from the analyzer disk which passes through the hands so that a part thereof passes through member 20' rendering the hands visible. Thus, in this arrangement, with only one polarized member and an analyzer disk, the hands are always visible. However, the hands will vary in shade from one point to another in that they will appear dark with respect to the remainder of the clock face when the transmission axes of 20' and 34' are aligned and will appear lighter when the transmission axes are at right angles. This provides a striking visual effect in addition to the appearance and disappearance of the clock face.

In the combined advertising copy and clock display of FIGS. 1–3, the indicia on members 18 and 20 will alternately and selectively be rendered visible and clock hands 42 and 44 remain visible throughout their complete cycle of rotation and disappear at only one point in the cycle of rotation of disk 34. Disk 34 can be driven from mechanism 48 through a suitable gearing arrangement (not shown). Where the clock arrangement alone is used, FIG. 4, the hands are continuously visible at all times.

Although this invention has been illustrated and described in connection with particular embodiments thereof, it will be apparent to those skilled in the art that various changes and modifications may be made therein without departing from the spirit of the invention or from the scope of the appended claims.

I claim:

1. A display device in the form of a combination advertising copy display and clock and comprising, in combination,
  a first member at least a portion of which is polarized to exhibit a defined, uniform light transmission axis throughout,
  a second member at least a portion of which is polarized to exhibit a defined, uniform light transmission axis throughout,
  said portions of said first and second members arranged in overlapping relation and having the transmission axes thereof arranged at an angle to each other,
  means defining restricted areas in the polarized portions of said first and second portions, said restricted areas being characterized by having characteristics which are different from the characteristics of the remainder of said portions of said first and second members so that said restricted areas provide a contrast with said first and second portions,
  at least a portion of said restricted areas on one of said first and second members taking the form of clock face indicia,
  an analyzing member at least a portion of which is polarized to exhibit a defined, uniform transmission axis throughout, means for providing relative movement between said analyzing member and said first and second members and with the polarized portion of said analyzing member in overlapping relation with the polarized portions of said first and second members and in a manner such that the angular relation of the transmission axis of one of said first, second and analyzing members is continuously changing with respect to the axes of the other two, first and second clock hand members arranged operatively adjacent said clock indicia and each including an overlay of at least two layers of material each having a defined, uniform light transmission axis throughout and the light transmission axes of said layers being arranged at an angle to each other, and clock drive mechanism connected to and driving said clock hands with respect to said clock indicia.

2. The display device of claim 1 wherein the material of said clock hand layers is birefringent.

3. The display device of claim 2 wherein the transmission axes of the layers of each of said clock hands are disposed at an oblique angle to each other.

4. The display device of claim 3 wherein said polarized portions of said first and second members comprise polarized film including a polarized emulsion, and wherein said polarized film is characterized by the polarized properties of said emulsion being destroyed in said restricted areas.

5. The display device of claim 1 wherein said clock hands are positioned between said first and second members.

6. A display device in the form of a combination copy display and clock and comprising, in combination, a first member polarized to exhibit a defined, uniform light transmission axis throughout, a second member polarized to exhibit a defined, uniformed light transmission axis throughout, said first and second members arranged in overlapping relation and having the transmission axes thereof arranged at an angle to each other, means defining restricted areas in said first and second members, said restricted areas being characterized by having characteristics which are different from the characteristics of the remainder of said first and second members so that said restricted areas provide a contrast with the remainder of said first and second members, at least a portion of said restricted areas taking the form of clock face indicia, an analyzing member polarized to exhibit a defined, uniform transmission axis throughout, means for providing relative movement between said analyzing member and said first and second members and with said analyzing member in overlapping relation with said first and second members and in a manner such that the angular relation of the transmission axis of said analyzing member is continuously changing with respect to the transmission axes of said first and second member, clock hand members arranged operatively adjacent said clock indicia and each including an overlay of at least two layers of material having light transmission axis and characterized by being invisible when the transmission axis thereof is aligned with the transmission axis of said analyzing member and becoming visible when said light transmission axis has been displaced from said alignment, said layers of each clock hand being arranged with their transmission axes arranged at an angle to each other, and clock drive mechanism connected to and driving said clock hands.

7. The display device of claim 6 wherein the material of said clock hand layers is birefringent and wherein the transmission axes of the layers of each of said clock hands are disposed at an oblique angle to each other.

8. The display device of claim 7 wherein said clock hands are disposed between said first and second members.

9. The display device of claim 8 wherein said oblique angle is a 45° angle.

10. The display device of claim 6 wherein said polarized members are characterized by the polarized properties thereof being destroyed in said restricted areas.

11. A display device in the form of a combination copy display and clock comprising, in combination, first and second fixed members each polarized to exhibit a defined, uniform light transmission axis generally throughout, and arranged with their respective light transmission axes arranged at an angle to each other, means defining restricted areas in said first and second members characterized by having the uniform polarized properties thereof altered so that said restricted areas do not exhibit the same light transmission properties as the remainder of said first and second members, at least a portion of the restricted areas of one of said first and second members taking the form of clock face indicia.

an analyzing member polarized to exhibit a defined, uniform light transmission axis generally throughout, means for rotating said analyzing member with respect to said first and second members and with said analyzing member in overlapping relation with the restricted areas of said first and second members so that the angular relation of the transmission axis of said analyzing member is continually changing with respect to the light transmission axes of said first and second members to selectively and alternately render the restricted areas of said first and second members visible, clock hand members arranged between said first and second members and each including an overlay of at least two layers of birefringent material having a transmission axis and characterized by the layers of each of said clock hands having the transmission axes thereof disposed at an oblique angle to each other, said clock hands also arranged to overlap said analyzing member so that the angular relationship between the transmission axes of said analyzing member and of said clock hand layers is continually changing, and clock drive means connected to and driving said clock hands.

12. A display device comprising, in combination, a fixed member polarized to exhibit a defined, uniform light transmission axis generally throughout, means defining restricted areas in said fixed member characterized by having the polarization thereof altered so that said restricted areas do not exhibit the same light transmission properties as the remainder of said fixed member, at least a portion of said restricted areas taking the form of a clock face indicia, an analyzing member polarized to exhibit a defined, uniform light transmission axis generally throughout, means for moving said analyzing member relative to said fixed member and with said analyzing member in overlapping relation with said fixed member and in a manner such that the angular relation of the transmission axis of said analyzing member is continually changed with respect to the transmission axis of said fixed member, clock hand members arranged operatively adjacent said clock indicia and each including an overlay of at least two layers of material having light transmission axes and characterized by being invisible when the transmission axes thereof are aligned with the transmission axis of said analyzing member and becoming visible when the light transmission axes thereof have been displaced from said alignment with the transmission axis of said analyzing member, said layers on each clock hand member being arranged with their transmission axes arranged at an angle to each other so that said clock hands remain visible during the full range of movement of said analyzing member, and clock drive mechanism connected to and driving said clock hands.

13. The display device of claim 12 wherein said hand members are arranged between said fixed member and said analyzing member.

14. The display device of claim 13 wherein the material of said clock hand layers is birefringent and wherein the transmission axes of the layers of each of said clock hands are disposed at an oblique angle to each other.

15. The display device of claim 14 wherein said oblique angle is a 45° angle.

16. The display device of claim 14 wherein said restricted areas are characterized by the polarized properties thereof being destroyed so that their areas do not exhibit a defined light transmission axis.

17. A display device comprising, in combination, a first member polarized to exhibit a defined, uniform light transmission axis throughout, a second member polarized to exhibit a defined, uniform light transmission axis throughout, said first and second members fixed in overlapping relation and having transmission axes thereof arranged at an angle to each other, means defining restricted areas in each of said first and second members characterized by having the uniform polarization properties thereof being altered so that said restricted areas do not exhibit the same characteristics as the remainder of said first and second members, an analyzing member arranged in overlapping relation with said first and second member and polarized to exhibit a defined, uniform light transmission axis, and means for moving said analyzing member relative to said first and second members with the angular relation of the transmission axis of said analyzing member continually changing with respect to the transmission axes of said first and second members to selectively and alternately permit transmission of light through said first and second members to render the restricted areas thereof visible.

18. The display device of claim 17 wherein said restricted areas are characterized by the polarized properties thereof being destroyed so that their areas do not exhibit a defined light transmission axis.

No references cited.

RICHARD B. WILKINSON, *Primary Examiner.*

G. F. BAKER, *Assistant Examiner.*